United States Patent [19]
Koestler et al.

[11] 3,922,255
[45] Nov. 25, 1975

[54] METHOD OF PRODUCING UNIFORM POLYMER BEADS

[75] Inventors: Donald J. Koestler, Philadelphia; Melvin Barry Robin, Elkins Park, both of Pa.

[73] Assignee: Rohm & Haas Company, Philadelphia, Pa.

[22] Filed: June 3, 1974

[21] Appl. No.: 475,716

Related U.S. Application Data

[63] Continuation-in-part of Ser. No. 254,633, May 15, 1972.

[52] U.S. Cl. ..... 260/80.78; 260/2.1 R; 260/85.5 ES; 260/85.5 HC; 260/87.5 R; 260/88.2; 260/88.7 G; 260/89.5 AW; 260/91.5; 260/93.5 W
[51] Int. Cl. .............................................. C08f 1/11
[58] Field of Search .......... 260/80.78, 93.5 W, 88.2, 260/85.5 ES, 85.5 HC, 87.5 R

[56] References Cited
UNITED STATES PATENTS

| | | | |
|---|---|---|---|
| 2,618,626 | 11/1952 | van Dijk et al. | 260/82.3 |
| 2,694,700 | 11/1954 | Shanta | 260/88.7 |
| 2,715,118 | 8/1955 | Grim | 260/93.5 |
| 2,813,850 | 11/1957 | Van Dijk et al. | 260/92.8 |
| 3,042,970 | 7/1962 | Terenzi | 18/47.3 |

FOREIGN PATENTS OR APPLICATIONS

| | | |
|---|---|---|
| 113,889 | 3/1965 | Czechoslovakia |
| 710,498 | 6/1954 | United Kingdom |

OTHER PUBLICATIONS

Encyclopedia of Polymer Science and Technology, Vol. 13, (1971)–pp. 552–571 "Suspension Polymerization."
Hohenstein and Mark, J. Polymer Science, 1946, Vol. 1, pp. 127–135.

*Primary Examiner*—Joseph L. Schofer
*Assistant Examiner*—A. L. Clingman

[57] ABSTRACT

This invention relates to methods of carrying out the polymerization of polymerizable liquids in suspension in an immiscible aqueous medium and concurrently forming solid polymer beads of controllable uniform size.

11 Claims, 1 Drawing Figure

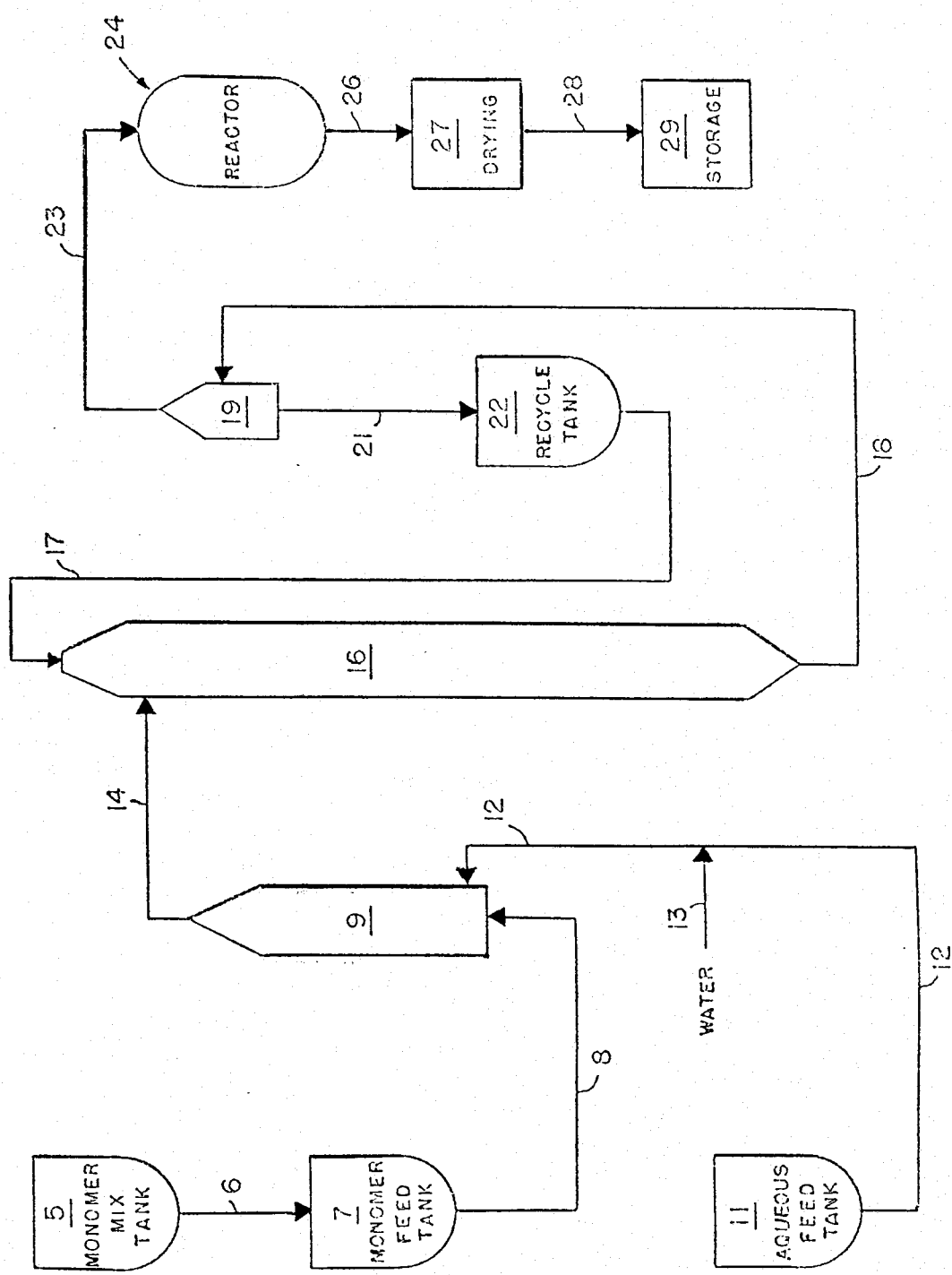

METHOD OF PRODUCING UNIFORM POLYMER BEADS

HISTORY

This application is a continuation-in-part application to our earlier filed and co-pending application, Serial No. 254,633 filed May 15, 1972, and entitled "Method of Producing Uniform Polymer Beads."

Methods of suspension polymerization are known as based on a mechanical mixing of a heated mixture in the organic phase of polymerizing monomers which contain polymerization initiators in solution, and of the aqueous phase which is composed of an aqueous solution of suspension stabilizers. These two phases are mixed in the course of polymerization by variously designed mixing means with a resulting suspension of the polymerizing monomer.

The size of the polymerizing drops and the distribution of their size are dependent on the physical characteristics of both phases, like the difference of the specific gravities, of interfacial tensions, of the viscosities, but especially on the hydrodynamic condition of the system given (for instance by the shape of the mixer, by the velocity of its revolutions, by the shape of the vessel, etc.)

This method can be used discontinuously (Czechoslovak Pats. No. 91,596; 97,129; 103,221; American Pat. No. 2,715,118; British Pat. No. 710,498), or continuously (Czechoslavak Pat. No. 99,654; patent of the German Federal Republic No. 1,111,823; U.S. Pat. No. 2,694,700; Canadian Pat. No. 494,374.) A related suspension polymerization method is revealed in Czechoslovak Pat. No. 113,889.

In a typical method of suspension polymerization, which is most usually conducted discontinuously, there is a comparatively wide distribution in size of the particles of the polymer formed. Often less than 50% of the polymer particles or beads will be of uniform size. Another probable drawback of this method is the formation of a polymer in emussion form, which often causes a clustering of the suspension polymer, thereby making recovery of polymer more difficult and reducing yield.

It is therefore an object of this invention to provide an improved method of producing copolymer beads having controlled particle size and narrow particle size distribution.

We have now discovered a novel method of suspension polymerization of vinyl monomers in which the mixture, containing one or more of a monovinyl and/or a polyvinyl monomer, and the polymerization initiator, is combined with a monomer immiscible aqueous solution or suspension of the stabilizer by jetting the monomer mixture through capillary openings to form droplets in the aqueous phase.

In this way, vinyl or divinyl monomers, or their mixtures, for example, styrene, divinylbenzene, acrylic and methacrylic acid or their esters, can be polymerized or copolymerized. Other comonomers that may be usefully employed are acrylonitrile, trimethylolpropanetrimethacrylate (TMPTMA), trimethylolpropane dimethacrylate (TMPDMA), and pentaerythritol tetramethacrylate, and its trimethacrylate analog.

The monomers can be used by themselves, or mixed with inert liquids or pre-polymers which are dissolved in the monomers, or by prepolymerization of monomers, or by a combination of both methods. A minimal solubility of the monomer(s) in the aqueous stabilizer solution is important. Decreased solubility can be achieved by the addition of an electrolyte to the aqueous solution of the stabilizer.

All commonly used stabilizers, especially gelatine, starch, carboxymethylcellulose, polyacrylic acids, polyvinyl alcohol; or water-insoluble inorganic compounds in particulate form, like bentonite, magnesium hydroxide, etc., or their combinations can be used as stabilizers for suspension polymerization.

The usual initiators for radical polymerization (organic peroxides, redox systems, etc.) are used to start the reaction. The polymerization temperature depends on the polymerization system used and can fluctuate between 50°C. and 100°C. If polymerization is conducted under pressure, even higher temperatures can be used.

Other objects, features, and advantages of the present invention will become apparent to those skilled in the art from a study of the following descriptions, examples, and drawing.

Referring now to the drawing, one or more liquid monomers are conventionally metered (not shown) into a mix tank 5. Typically, a monovinyl aromatic, such as styrene, a polyvinyl aromatic such as divinylbenzene, and ethylenically unsaturated monomers, such as acrylonitrile and methyl acrylate, are admixed in tank 5 under an inert gaseous blanket, with the temperature being maintained at a level that will preclude the start of polymerization in the presence of the polymerization initiator. The latter is added in a conventional manner (not shown) to tank 5 after the monomer components are admixed.

The liquid mix containing the initiator passes via conduit 6 from the bottom of tank 5 to the top of monomer feed tank 7. The mixture is maintained cooled therein, and then pumped at a controlled rate through conduit 8 to the bottom of column 9.

The monomer from feed tanl 7 is introduced into the bottom of column 9 through a large plurality of orifices. These orifices range in diameter generally from 0.004 to 0.015 inches. Most conveniently, the device used is one or more perforated discs with the holes spaced in such a manner as to not disturb the uniformity of the droplets being formed.

The size of the droplets formed is dependent on:
a. the diameter of the orifices,
b. the monomer flow rate through the orifices,
c. the difference in the physical properties; viz. viscosity, density, and surface tension, of the aqueous and monomeric media, and
d. the material from which the orifices are formed.

The orifices may be formed through metal, glass, plastic, or even rubber. It is noted that the surface tension of the material affects the jet velocity through the orifice.

A separate feed tank 11 is provided to prepare a concentrated form of the aqueous medium, which stabilizes the organic droplets formed by the introduction of the monomer mix from tank 7 into the bottom of column 9. This aqueous medium contains the aforementioned commonly used stabilizers such as gelatin, and is buffered with caustic soda and boric acid. The aqueous medium is prepared by dissolving or dispersing the ingredients in a suitable amount of water at 30° – 80°C.

The concentrated aqueous medium is allowed to flow from the bottom of tank 11 through conduit 12. During this passage it is continuously diluted to use concentrations by the admixing of additional water, via conduit 13, which water has been previously adjusted to a suitable temperature. The diluted aqueous medium is introduced near the base of column 9 in such a manner as to minimize turbulence. The aqueous medium is introduced into column 9 in close proximity to the drop-forming filaments of monomer. At this point the aqueous medium stabilizes the monomer droplets as they are formed.

Continuous introduction of the aqueous phase to column 9 is preferable to provide fresh medium to stabilize the droplets as they are formed. The buoyant, newly-formed drops, which are relatively uniform in size, rise through column 9 by virtue of their buoyancy. The aqueous medium which is introduced near the bottom also flows out the top of column 9.

The top of this column is tapered in such a way that turbulence which would alter the drop uniformity is avoided. This is accomplished by means which are readily known to those skilled in the art of designing flow through conduits.

The mixture of stabilized monomer droplets and aqueous medium is introduced into the upper part of column 16 via a conduit 14. Column 16 is maintained in the range of 50°-90°C., thereby providing the proper temperature for the initiation of the polymerization of the monomers.

The proper temperature in column 16 can be maintained by the introduction of an aqueous stream entering at the top of column 16 via conduit 17. This aqueous stream combines with the aqueous stream from column 9 after it enters column 16, and the combined aqueous stream exit from the bottom of column 16. The velocity of the aqueous stream is maintained such that it overcomes the buoyant force of the polymerizing monomer drops and imparts a small net downward velocity to the monomer droplets. By suitable adjustments of the aqueous velocity, precise control of the droplet residence time is achieved.

Column 16 is operated in such a manner that the efflux from the bottom of the column is a mixture of now partially polymerized monomer drops and aqueous medium. Alternatively, both streams 8 and 12 may be introduced into the upper end of column 9, and the droplets flowed from the bottom thereof to column 16.

The height of column 16 is such that by suitable adjustment of the aqueous flow velocity therethrough and the aqueous medium temperature, the desired degree of polymerization can be achieved in the droplets which flow from the bottom of column 16. It is highly preferable to achieve such a degree of polymerization therein, such that the droplets will not change their shape or size when subjected to shear stresses commonly experienced in moderately agitated systems. The importance of this feature will become apparent as further disclosures are made.

The slurry of partially polymerized droplets in aqueous medium flows from the bottom of column 16 via conduit 18 to a suitably designed vessel 19. In this tank 19 advantage is taken of the buoyant nature of the partially polymerized droplets and the slurry is concentrated from 8 – 30% droplets up to 40-60% droplets. The concentrated slurry flows from the top of the tank, whereas the aqueous medium, now essentially free of droplets, is allowed to flow from the bottom of the tank. The top of vessel 19 is conical in nature, to facilitate the concentration of the droplets or beads. The volume of the vessel is such that there is sufficient residence time for the concentration of the beads to occur.

The separated aqueous liquid from vessel 19 flows from the bottom of said tank through conduit 21 to recycle tank 22. In tank 22 the aqueous liquid is accumulated for recycle to column 16. Extraneous solids are removed in this tank by suitable techniques well known to the art. The aqueous liquid returns through conduit 17 into the top of column 16 for recycle. On its passage through conduit 17 the aqueous recycle is either heated or cooled, as required, to maintain the proper temperature range in column 16 previously described.

The concentrated bead slurry flowing from the top of tank 19 is led by conduit 23 to a bank of agitated reactors, generally noted by 24, wherein the polymerization of the droplets is completed. Each reactor is operated batch style, first by introducing an amount of aqueous suspension mixture capable of being agitated, and then an appropriate amount of concentrated droplet slurry such as to make full use of the reactor volume available. When the reactor is filled by use of the aforementioned technique the temperature is varied in such a manner as to complete the polymerization.

It is essential that the beads entering reactor 24 be sufficiently polymerized so as to maintain their size and shape during the completion of the polymerization. If the drops are not sufficiently polymerized the generation of a large amount of very small polymer particles will occur in reactor 24.

After completion of the polymerization, the bead slurry may pass via conduit 26 to an optionally provided slurry holding vessel (not shown), or directly to a conventional dewatering device 27. The dewatered beads go via conduit 28 to product storage 29. The beads are then ready for packaging and shipment, or they may be further chemically treated to confer different characteristics thereon, as will be exemplified below. Although the beads or particles size is greatly influenced by orifice size and other factors, generally the size will vary from 0.20 to 2 millimeters in diameter. It has also been found desirable to space the orifices some distance apart. Understandably these distances may vary considerably depending on orifice size, flow rates, etc. A minimum spacing of 0.08 inch from center to center is however preferred. Similarly a jet veloxity of 0.25 to 10.00 cc/minute/orifice would most conveniently be applied, with preferred rates for each orifice size. Some preferred embodiments would utilize jet velocities and orifice sizes according to the following guide lines:

| | |
|---|---|
| 0.015 inch orifice | 2.0–7.5 cc/min/orifice |
| 0.010 inch orifice | 1.6–4.5 cc/min/orifice |
| 0.008 inch orifice | 1.3–2.8 cc/min/orifice |
| 0.0055 inch orifice | 0.9–1.8 cc/min/orifice |
| 0.0050 inch orifice | 0.7–1.8 cc/min/orifice |

As noted hereinbefore, preferably the orifices are formed through a metal disc. This preferred embodiment should in no way however be considered a limitation of the scope of the invention. Any substance of any shape possessing a plurality of orifices may be useful in the process of the invention.

It may be desirable that the copolymer beads produced by the foregoing process be subjected to further chemical processing such as sulfonation or chloromethylation for enhancing the chemical properties, as for selective ion exchange materials. Such procedures are well known in the art and could be carried out by preparation of a waterinsoluble, cross-linked resin containing reactive sulfonic acid groups by treating with a sulfonating agent, such as sulfur trioxide or sulfuric acid; or by the preparation of a water-insoluble, cross-linked resin containing reactive dimethylaminomethyl or trimethylammoniomethyl groups, by treating with a chloromethylating agent, followed by aminolysis with the appropriate amine.

EXAMPLE

The following monomers are metered into monomer mix tank 5, in the proportions indicated: 120 lbs. of acrylonitrile, 1580 lbs. of divinylbenzene, 10,240 lbs. of styrene and 60 lbs. of methyl acrylate monomer, which are all liquid monomers. The 45 lb. of 78% benzoylperoxide, a polymerization initiator, is added. The mixture flows through conduit 6 to monomer freed tank 7.

Residence time in the chilled, usually 5°–10°C, monomer feed tank 7 is about 8 hours. The thoroughly admixed, chilled and initiated monomers pass by a conduit 8 to formation column 9 at a rate of 1500 lbs. per hour. This column is a glass-lined, insulated vessel about 13 feet tall and is provided with an inwardly tapered upper section. Droplets of the monomer mix are formed by jetting through 30 metal discs, laterally located, each of which contains 387 holes which are 5.5 mil in diamter.

Preparation of the aqueous phase is accomplished by the metered introduction into aqueous tank 11 of: 3320 lbs. of city water; 570 lbs. of boric acid, 15 lbs. of Pharmagel, 300 lbs. of caustic soda, and 540 lbs. of Acrysol A-5, a poly(sodium acrylate) supplied by Rohm and Haas Company. Typically, this second feed tank has a stainless steel lining and a 600 gallon capacity. The aqueous medium in feed tank 11 is formulated to maintain a pH within the range of 6–12.

The aqueous phase is pumped via a conduit 12, at a rate ranging between 150 and 312 lbs. per hour. It is mixed with an additional 11 gallon/minute of water which is added via conduit 13. The diluted aqueous phase is introduced into column 9 and flows upwardly therethrough.

At the point of entry into column 9, the aqueous phase flow rate is 11.5 gallons per minute, averaging 74°C., with a pH of 8.0 to 9.0. Residence time in column 9 averages 3.5 minutes. The droplet-containing stream is passed by an overhead conduit 14 into the upper section of gelation column 16.

The gelation column provides the residence time required to achieve satisfactory droplet gelation, while avoiding areas of monomer or polymer accumulation. At the gel point, integrity is established to the degree that droplet identity can be maintained even in the shear field encountered in the agitated finishing vessel (to be described).

The partially polymerized beads or droplets flow from the lower end of column 16 in slurry form, at a rate of 17,400 lbs. per hour (8.6 weight percent beads). The stream temperature averages 68.5°C. as it enters separator 19, which is glass-lined steel, and has a capacity of 300 gallons.

The aqueous effluent from the separator 19 flows from the bottom portion thereof via conduit 21 at a rate of 28 gallons per minute to recycling system 22, and is subsequently returned by a conduit 17 to the top of gelation column 16. This recycle (64°C.) is introduced into the upper portion of column 16, and flows downwardly therethrough. The average bead residence time herein is 150 minutes.

The comparatively concentrated slurry of beads flows from the upper portion of separator 19 at a rate of 3410 lbs. per hour (44 weight percent polymerized beads) over the polymerization reactor 24 with introduction via conduit 23. Reactor 24 is steam heated by the use of low pressure steam, and water cooled to operate in a temperature range of 50°–95°C. The reactor is glass-lined steel of 2,200 gallons capacity. This permits further bead polymerization to the degree desired under the present temperature conditions.

Initial residence time in reactor 24 averages 4 hours at 70°C. The batch temperature is increased to 80°C. for 1 hour, and then held, at 85°C. for an additional 1.5 hours whereupon the batch is passed via conduit 26 to an optional wet screener (not shown) and, thence, to a bead drying unit 27 with a capacity of 3000 lbs. per hour of solids.

Analysis shows that the average particle size is 0.42 – 0.45 mm with a distribution of 90% of the particles falling between 35 mesh (0.50 MM) and 45 mesh (0.35 MM).

We claim:

1. A method of suspension polymerization for providing substantially uniform particles of polymer beads comprising a polymer or copolymer derived from the monomers suitable for suspension polymerization and selected from one or more of a monovinyl monomer and a polyvinyl monomer, which comprises:
   a. forming in a first feed vessel a liquid mixture of the polymerizable monomer or monomers, and a suitable polymerization initiator, at a temperature level which essentially inhibits the initiation of polymerization;
   b. separately preparing in a second feed vessel an aqueous liquid that is suitable for maintaining a dispersion of liquid droplets of said monomer mixture;
   c. passing the monomer containing liquid from said first vessel through a first conduit into one end of a first column to flow therethrough;
   d. passing said monomer liquid into said column through a mechanical means having a plurality of orifices each having a diameter size ranging from 0.004 to 0.015 inches with a jet velocity ranging from 0.25 to 10.00 cc/minute/orifice;
   e. concurrently passing the aqueous liquid, which is substantially immiscible with said monomer, from said second vessel through a second conduit to said first column at a rate sufficient to stabilize the monomer droplets, where the effluent of said second conduit is in close proximity to said effluent of the first conduit;
   f. passing the droplet-containing third liquid from the other end of said first column through a third conduit into the upper section of a second column to flow therethrough at a temperature to initiate polymerization of monomer within the droplets;
   g. concurrently introducing into the upper section of said second column via a fourth conduit a downflowing aqueous stream at a flow rate which will allow the more buoyant monomer droplets residence time sufficient to reach a point of polymerization whereby the droplets will no longer lose their particulate identity as beads;
   h. allowing the partially polymerized droplets while dispersed in the aqueous liquid to flow from the lower section of said second column through a fifth conduit to a system for gravity separation and for concentrating said beads in said aqueous liquid;

i. allowing a comparatively concentrated slurry of said beads to flow from said separation system through a sixth conduit to a polymerization zone wherein said beads are further polymerized to the extent desired under temperature conditions suitable to that purpose; and j. transferring the polymerized beads from the lower portion of said polymerization zone through a seventh conduit for further processing.

2. The process of claim 1 wherein the excess aqueous phase formed in said gravity separation system is recycled to and through said second column via an eighth conduit, thereby providing the stream that drives the droplets downwardly therethrough.

3. The method of claim 2 wherein said excess aqueous stream is passed through a surge and settling means before entering said second column, whereby extraneous polymeric particles are substantially removed.

4. The method of claim 1 wherein said plurality of droplets are formed from filaments issuing at a jet velocity ranging from 0.8 to 5.0 cc/min/orifice whereby breakup of the filaments results in the formation of said droplets.

5. The method of claim 1 wherein the polymer leaving said polymerization zone is subjected to chemical treatment to enhance its properties as a selective ion exchange resin.

6. The method of claim 1 wherein four monomers are incorporated into said liquid mixture formed in said first feed vessel.

7. The method of claim 1 wherein said monomer mixture comprises styrene, divinylbenzene, acrylonitrile, and methyl acrylate.

8. The method of claim 1 in which said monovinyl monomer component is selected from one of styrene, α-methylstyrene, ethylstyrene, chlorostyrene, methyl acrylate, acrylonitrile, and vinylbenzyl chloride.

9. The method of claim 1 in which said polyvinyl monomer component is selected from one of divinylbenzene, trimethylolpropane, trimethacrylate, trimethylolpropane dimethacrylate, pentaerythritrol trimethacrylate, pentaerythritol tetramethacrylate, pentaerythritol dimethacrylate, and neopentyl dimethacrylate.

10. The method of claim 1 in which the mechanical means to extrude said monomers is a perforated disc.

11. The method of claim 1 wherein said aqueous liquid of step (b) contains poly(sodium acrylate) and hydrolyzed animal protein buffered with sodium borate within the pH range of 6–12.

* * * * *